US007965201B2

(12) United States Patent
Shah et al.

(10) Patent No.: US 7,965,201 B2
(45) Date of Patent: Jun. 21, 2011

(54) METHOD AND APPARATUS FOR DETECTING CONDITIONS CONDUCIVE TO ICE FORMATION

(75) Inventors: Anil D. Shah, Renton, WA (US); Alankar Gupta, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 473 days.

(21) Appl. No.: 12/133,831

(22) Filed: Jun. 5, 2008

(65) Prior Publication Data

US 2009/0321576 A1    Dec. 31, 2009

Related U.S. Application Data

(60) Continuation of application No. 11/626,282, filed on Jan. 23, 2007, now Pat. No. 7,628,359, which is a division of application No. 10/417,309, filed on Apr. 16, 2003, now Pat. No. 7,175,136.

(51) Int. Cl.
*G08B 23/00* (2006.01)
*B64D 15/20* (2006.01)
(52) U.S. Cl. ............... 340/962; 701/14; 244/134 F
(58) Field of Classification Search .. 244/134 R–134 F; 416/36, 37, 39, 42; 340/602, 580–583, 962; 374/109, 142, 16, 28, 143; 60/39.093; 701/1, 701/3, 14
See application file for complete search history.

(56) References Cited

U.S. PATENT DOCUMENTS

| | | |
|---|---|---|
| 1,616,008 A | 2/1927 | Stout |
| 1,835,370 A | 12/1931 | Bellanca |
| 2,240,310 A | 4/1941 | McKay |
| 2,387,708 A | 10/1945 | Arnhym |
| 2,656,525 A | 10/1953 | Kinsella |
| 2,699,537 A | 1/1955 | Sederstrom |
| 2,755,456 A | 7/1956 | Bursack |
| 2,850,083 A | 9/1958 | Frost |
| 2,970,475 A | 2/1961 | Werner |
| 3,000,213 A | 9/1961 | Eves et al. |
| 3,057,198 A | 10/1962 | Crouchman |

(Continued)

FOREIGN PATENT DOCUMENTS

DE    1 095 131    12/1960

(Continued)

OTHER PUBLICATIONS

"RAP Annual Scientific Report 2003," http://web.archive.org/web/20040406114809/www.rap.ucar.edu/asr2003/in-flight-icing.html, (10 pgs.).

(Continued)

*Primary Examiner* — Joshua J Michener
(74) *Attorney, Agent, or Firm* — Perkins Coie LLP

(57) ABSTRACT

A method for detecting ambient conditions conducive to ice formation. The method includes the steps of measuring at least one parameter selected from a group of parameters consisting of a static pressure, a total pressure, a total temperature, a dew point temperature, and a liquid water content, and determining whether ambient conditions are conducive to ice formation based on the measured parameter.

17 Claims, 6 Drawing Sheets

U.S. PATENT DOCUMENTS

| | | |
|---|---|---|
| 3,083,546 A | 4/1963 | Turek et al. |
| 3,096,054 A | 7/1963 | Ciminaghi |
| 3,097,982 A | 7/1963 | Stoner |
| 3,145,000 A | 8/1964 | Mackie |
| 3,167,960 A | 2/1965 | Miesiak |
| 3,201,990 A | 8/1965 | Wald |
| 3,229,271 A | 1/1966 | Frant |
| 3,236,093 A | 2/1966 | Werner |
| 3,276,254 A | 10/1966 | Richard |
| 3,284,003 A | 11/1966 | Ciemochowski |
| 3,287,974 A | 11/1966 | Ciemonchowski |
| 3,422,677 A | 1/1969 | Lockwood |
| 3,466,220 A | 9/1969 | Allinikov et al. |
| 3,493,450 A | 2/1970 | Judge, Jr. |
| 3,517,900 A | 6/1970 | Roussel |
| 3,596,263 A | 7/1971 | Ciemochowski |
| 3,596,264 A | 7/1971 | Ciemochowski |
| 3,612,173 A | 10/1971 | Goyal |
| 3,697,726 A | 10/1972 | Geronime |
| 3,798,971 A | 3/1974 | Lowrance |
| 3,820,628 A | 6/1974 | Hanson |
| 3,821,999 A | 7/1974 | Guess et al. |
| 3,910,374 A | 10/1975 | Holehouse |
| 3,917,193 A | 11/1975 | Runnels, Jr. |
| 3,921,480 A | 11/1975 | Ball |
| 3,933,327 A | 1/1976 | Cook et al. |
| 3,940,622 A | 2/1976 | Stallabrass et al. |
| 3,948,346 A | 4/1976 | Schindler |
| 3,976,270 A | 8/1976 | Catchpole |
| 4,032,090 A | 6/1977 | Thornton-Trump |
| 4,035,535 A | 7/1977 | Taylor |
| 4,036,457 A | 7/1977 | Volkner et al. |
| 4,129,993 A | 12/1978 | Schotten |
| 4,152,938 A | 5/1979 | Danninger |
| 4,210,021 A | 7/1980 | Vykhodtsev et al. |
| 4,222,044 A | 9/1980 | Boschung |
| 4,284,443 A | 8/1981 | Hilton |
| 4,304,376 A | 12/1981 | Hilton |
| 4,333,004 A | 6/1982 | Forgue et al. |
| 4,393,692 A | 7/1983 | Clark et al. |
| 4,403,872 A | 9/1983 | DeLeo |
| 4,475,624 A | 10/1984 | Bourland, Jr. et al. |
| 4,482,114 A | 11/1984 | Gupta et al. |
| 4,503,707 A | 3/1985 | Rosa et al. |
| 4,508,295 A | 4/1985 | Cattaneo et al. |
| 4,522,859 A | 6/1985 | Blair |
| 4,579,462 A | 4/1986 | Rall et al. |
| 4,611,492 A | 9/1986 | Koosmann |
| 4,674,714 A | 6/1987 | Cole et al. |
| 4,688,745 A | 8/1987 | Rosenthal |
| 4,733,834 A | 3/1988 | Phillips, II |
| 4,738,416 A | 4/1988 | Birbragher |
| 4,743,740 A | 5/1988 | Adee |
| 4,749,150 A | 6/1988 | Rose et al. |
| 4,752,049 A | 6/1988 | Cole |
| 4,757,963 A | 7/1988 | Cole |
| 4,759,513 A | 7/1988 | Birbragher |
| 4,803,108 A | 2/1989 | Leuchten et al. |
| 4,808,009 A | 2/1989 | Sittler et al. |
| 4,831,819 A | 5/1989 | Norris et al. |
| 4,850,093 A | 7/1989 | Parente |
| 4,890,494 A | 1/1990 | Osbond et al. |
| 4,907,449 A | 3/1990 | Call et al. |
| 4,908,599 A | 3/1990 | Breen et al. |
| 4,925,721 A | 5/1990 | Harper-Tervet et al. |
| 4,926,963 A | 5/1990 | Snyder |
| 4,980,673 A | 12/1990 | Kleven |
| 5,003,295 A | 3/1991 | Kleven |
| 5,006,391 A | 4/1991 | Biersach |
| 5,011,098 A | 4/1991 | McLaren et al. |
| 5,025,888 A | 6/1991 | Arcas et al. |
| 5,041,323 A | 8/1991 | Rose et al. |
| 5,041,324 A | 8/1991 | Siegling et al. |
| 5,043,558 A | 8/1991 | Byles |
| 5,088,277 A | 2/1992 | Schulze |
| 5,114,100 A | 5/1992 | Rudolph et al. |
| 5,140,135 A | 8/1992 | Freeman |
| 5,243,185 A | 9/1993 | Blackwood |
| 5,257,498 A | 11/1993 | Nikkanen et al. |
| 5,313,202 A | 5/1994 | Hansman, Jr. et al. |
| 5,354,015 A | 10/1994 | Meador |
| 5,365,731 A | 11/1994 | Nikkanen et al. |
| 5,398,547 A | 3/1995 | Gerardi et al. |
| 5,400,984 A | 3/1995 | Arnold et al. |
| 5,415,522 A | 5/1995 | Pla et al. |
| 5,423,658 A | 6/1995 | Pla et al. |
| 5,484,121 A | 1/1996 | Padawer et al. |
| 5,488,375 A | 1/1996 | Michie |
| 5,498,127 A | 3/1996 | Kraft et al. |
| 5,551,288 A | 9/1996 | Geraldi et al. |
| 5,575,440 A | 11/1996 | LeBlond et al. |
| 5,590,849 A | 1/1997 | Pla |
| 5,616,861 A | 4/1997 | Hagen |
| 5,619,144 A | 4/1997 | Stormbom |
| 5,628,565 A | 5/1997 | Hagen et al. |
| 5,644,080 A | 7/1997 | Stormbom et al. |
| 5,650,610 A | 7/1997 | Gagnon |
| 5,653,538 A | 8/1997 | Phillips |
| 5,683,062 A | 11/1997 | Spiro et al. |
| 5,702,231 A | 12/1997 | Dougherty |
| 5,748,091 A | 5/1998 | Kim |
| 5,752,674 A | 5/1998 | Mears et al. |
| 5,763,858 A | 6/1998 | Jones |
| 5,776,579 A | 7/1998 | Jessup et al. |
| 5,777,481 A | 7/1998 | Vivekanandan |
| 5,814,137 A | 9/1998 | Blohowiak et al. |
| 5,841,079 A | 11/1998 | Parente |
| 5,849,110 A | 12/1998 | Blohowiak et al. |
| 5,869,140 A | 2/1999 | Blohowiak et al. |
| 5,869,141 A | 2/1999 | Blohowiak et al. |
| 5,874,672 A | 2/1999 | Gerardi et al. |
| RE36,215 E | 6/1999 | Rosenthal |
| 5,934,617 A | 8/1999 | Rutherford |
| 5,939,197 A | 8/1999 | Blohowiak et al. |
| 5,965,814 A | 10/1999 | French et al. |
| 6,037,060 A | 3/2000 | Blohowiak et al. |
| 6,049,282 A | 4/2000 | MacKenzie |
| 6,070,475 A | 6/2000 | Muehlhauser et al. |
| 6,140,942 A | 10/2000 | Bragg et al. |
| 6,155,060 A | 12/2000 | Parkman |
| 6,194,685 B1 | 2/2001 | Rutherford |
| 6,211,494 B1 | 4/2001 | Giamati et al. |
| 6,237,874 B1 | 5/2001 | Rutherford et al. |
| 6,247,669 B1 | 6/2001 | Rauckhorst, III et al. |
| 6,250,149 B1 | 6/2001 | Black |
| 6,250,801 B1 | 6/2001 | Bernard |
| 6,263,680 B1 | 7/2001 | Newman et al. |
| 6,263,690 B1 | 7/2001 | Sokolean et al. |
| 6,269,320 B1 | 7/2001 | Otto |
| 6,304,194 B1 | 10/2001 | McKillip |
| 6,320,511 B1 | 11/2001 | Cronin et al. |
| 6,328,467 B1 | 12/2001 | Keyhani |
| 6,347,767 B1 | 2/2002 | Holmen |
| 6,367,268 B1 | 4/2002 | Paul |
| 6,370,450 B1 | 4/2002 | Kromer et al. |
| 6,371,411 B1 | 4/2002 | Breer et al. |
| 6,384,611 B1 | 5/2002 | Wallace et al. |
| 6,430,995 B1 | 8/2002 | Feller et al. |
| 6,430,996 B1 | 8/2002 | Anderson et al. |
| 6,434,504 B1 | 8/2002 | Eryurek et al. |
| 6,438,502 B1 | 8/2002 | Awtrey et al. |
| 6,449,574 B1 | 9/2002 | Eryurek et al. |
| 6,457,676 B1 | 10/2002 | Breer et al. |
| 6,460,359 B1 | 10/2002 | Lauwers |

| | | | |
|---|---|---|---|
| 6,468,360 | B1 | 10/2002 | Andrews |
| 6,490,876 | B2 | 12/2002 | Derryberry et al. |
| 6,519,546 | B1 | 2/2003 | Eryurek et al. |
| 6,581,391 | B2 | 6/2003 | Horey et al. |
| 6,592,963 | B1 | 7/2003 | Levit |
| 6,609,592 | B2 | 8/2003 | Wilson |
| 6,609,825 | B2 | 8/2003 | Ice et al. |
| 6,631,638 | B2 | 10/2003 | James et al. |
| 6,688,558 | B2 | 2/2004 | Breer et al. |
| 6,736,354 | B2 | 5/2004 | Goto et al. |
| 6,767,129 | B2 | 7/2004 | Lee et al. |
| 6,809,648 | B1 | 10/2004 | Fleming |
| 6,813,020 | B2 | 11/2004 | Roques et al. |
| 6,827,180 | B2 | 12/2004 | Wilson |
| 6,827,485 | B2 | 12/2004 | Isebrand |
| 6,868,721 | B2 | 3/2005 | Szilder et al. |
| 6,905,242 | B2 | 6/2005 | Heuer et al. |
| 6,910,659 | B2 | 6/2005 | Friddell et al. |
| 7,086,834 | B2 | 8/2006 | LeMieux |
| 7,090,167 | B2 | 8/2006 | Friddell et al. |
| 7,150,560 | B2 | 12/2006 | Hanson et al. |
| 7,174,782 | B2 | 2/2007 | Ice |
| 7,175,136 | B2 | 2/2007 | Shah et al. |
| 7,331,421 | B2 | 2/2008 | Olsen et al. |
| 2002/0131474 | A1 | 9/2002 | Suga |
| 2003/0058919 | A1 | 3/2003 | Ice et al. |
| 2004/0095984 | A1 | 5/2004 | Severson |
| 2005/0089082 | A1 | 4/2005 | Anderson et al. |
| 2007/0267546 | A1 | 11/2007 | Shah et al. |
| 2008/0218385 | A1 | 9/2008 | Cook et al. |

FOREIGN PATENT DOCUMENTS

| | | |
|---|---|---|
| DE | 3506317 C1 | 2/1986 |
| EP | 0 509 166 A1 | 10/1992 |
| EP | 0 893 342 A2 | 1/1999 |
| GB | 609314 A1 | 9/1945 |
| GB | 674 750 | 7/1952 |
| GB | 674750 | 7/1952 |
| GB | 2 158 939 A | 11/1985 |
| GB | 2 283 315 | 5/1995 |
| GB | 2329016 | 3/1999 |
| WO | WO-81/01331 | 5/1981 |
| WO | WO-01/42751 | 6/2001 |
| WO | WO-2004/110865 A1 | 12/2004 |
| WO | WO-2005/020175 A1 | 3/2005 |

OTHER PUBLICATIONS

Mahoney, M. J., "In Situ Aircraft Temperature Measurement," http://mtp.jpl.nasa.gov/notes/sat/sat.html, Sep. 16, 2002 (7 pgs.).

"Aerospace Information Report SAE AIR 4367," Issue 1995-04, Society of Automotive Engineers Inc.

"Aerospace Standard SAE As 8181," Issue 1997-08, Society of Automotive Engineers Inc.

"AIAA-2001-0398 Certification and Integration Aspects of a Primary Ice Detection System," 39th Aerospace Sciences Meeting and Exhibit, Jan. 8-11, 2001.

"AIAA-2001-0679 Ludlan Limit Considerations on Cylinder Ice Accretion: Aerodynamics and Thermodynamics," 39th Aerospace Sciences Meeting & Exhibit, Jan. 8-11, 2001.

A-C Tech, "A-C™—130: Surface Preparation for Bonding Aluminum Structure," Advanced Chemistry & Technology (2 pages).

AC Tech—Locations Pages, Advanced Chemistry & Technology, © AC Tech, Inc. 2000, pp. 1-4, http://www.actechaero.com/index7.html [ Accessed Oct. 9, 2002].

Aeronca, Inc., "Brazed Structures," Magellan Aerospace Corporation, http://www.aeroncainc.com/aeronca_bs.html, © 2000-02 Magellan Aerospace Corporation, pp. 1-2, http://www.aeroncainc.com/aeronca_bs.html [Accessed Oct. 8, 2002].

Alcore, Trussgrid—Three Dimensional Honeycomb, © 1999 Alcore, Inc. (2 pages).

cfdrl.uc.edu, Stagnation Temperature, http://cfdrl.uc.edu/WebPage/Courses/comp-flow/cf_problems/cf_prob3.html; 1 pg; [accessed Jan. 25, 2008].

Cytec, "Aerospace and Engineered Materials," Cytec—Aerospace and Engineered Materials, Product Information, pp. 1-2, http//www.cytec.com/products4/aeropsacemenu.html, [Accessed Oct. 8, 2002].

Dean, P. D., "On the 'In-Situ' Control of Acoustic Liner Attenuation", Journal of Engineering for Power, Jan. 1977, pp. 63-70, American Society of Mechanical Engineers, N.Y.

Elliot Aviation, "New System Warns King Air Pilots of Inflight Icing," Wavelink News Magazine, Wavelink Articles, 2 pages, www.elliottaviation.com/wavelink/1998q2/wavart03A.asp <http://www.elliottaviation.com/wavelink/1998q2/wavart03A.asp> [accessed Nov. 20, 2002].

European Search Report, European Patent Application No. EP 00 20 4171, Search Completed Jan. 17, 2001 (3 Pages).

European Search Report, European Patent Application No. EP 03 07 8176, Search Completed Dec. 12, 2003 (2 pages).

Goodrich Aerostructures Group, Advanced Processes, © 2001, 2002 Goodrich Corporation, (1 page) http://www.rohr.com/html/rd_advanced.html [Accessed Oct. 8, 2002].

Goodrich Corporation, Sensor Systems, Model 101 and 102, Total Temperature Sensors, Measuring Total Temperature, www.aerospace.goodrich.com, 8 pages, Burnsville, MN, USA.

Goodrich Corporation, Sensor Systems, Model 102LJ2AG, Total Temperature Sensor, www.aerospace.goodrich.com, 2 pages, Burnsville, MN, USA.

Goodrich Corporation, Sensor Systems, Total Temperature Sensors, Technical Report 5755, www.aerospace.goodrich.com, 32 pages, Burnsville, MN, USA.

Hwang, D.P., "A Proof of Concept Experiment for Reducing Skin Friction by Using a Micro-Blowing Technique", NASA Technical Memorandum 107315, AIAA-97-0546, 35th Aerospace Sciences Meeting and Exhibit, American Institute of Aeronautics and Astronautics, Reno, Nevada, Jan. 6-9, 1997 (13 Pages).

Ingard, U. et al., "Acoustic Nonlinearity of an Orifice," The Journal of the Acoustical Society of America, vol. 42, No. 1, 1967, pp. 6-17.

Kim, J.J., "Heat Transfer Model of a Jet Pump Cowl Anti-Ice System," 1996 World Aviation Congress, SAE International and American Institute of Aeronautics and Astronautics, Los Angeles, California, Oct. 21-24, 1996, pp. 1-15.

Metallic Honeycomb (3 pages), http://www.honeycombone.com/metallic.htm [Accessed Oct. 8, 2002].

Noca, F. et al., "Aircraft Mounted Cloud Water Content Probe," New Technology Report, Center for Space Microelectronics Technology, Jet Propulsion Laboratory, 13 pages, Pasadena, California.

Schwartz, J. "Keep on Truckin," SIA Adhesives, A Sovereign Speciality Chemicals Subsidiary, Provides the Bond for General Motors' New Composite Truck Box, Adhesives Age, Oct. 5, 2000 (2 pages).

SEA International, "Aircraft Ice Detectors and Icing Rate Measuring Instruments," SEA AIR4367, Aerospace Information Report, Issued Apr. 1994, Society of Auomotive Engineers, Inc., USA.

Toray, Torayca Prepreg Products, pp. 1-3, http://www.torayusa.com/tca/products/prepreg.htm [Accessed Oct. 8, 2002].

Volvo, "Volvo S70 & V70 Manual," Volvo Car Corporation, 1998, Goteborg, Sweden (3 Pages).

Wikipedia, Total Air Temperature, http://en.wikipedia.org/wik/Total_air_temperature; 2 pgs; [accessed Jan. 25, 2008].

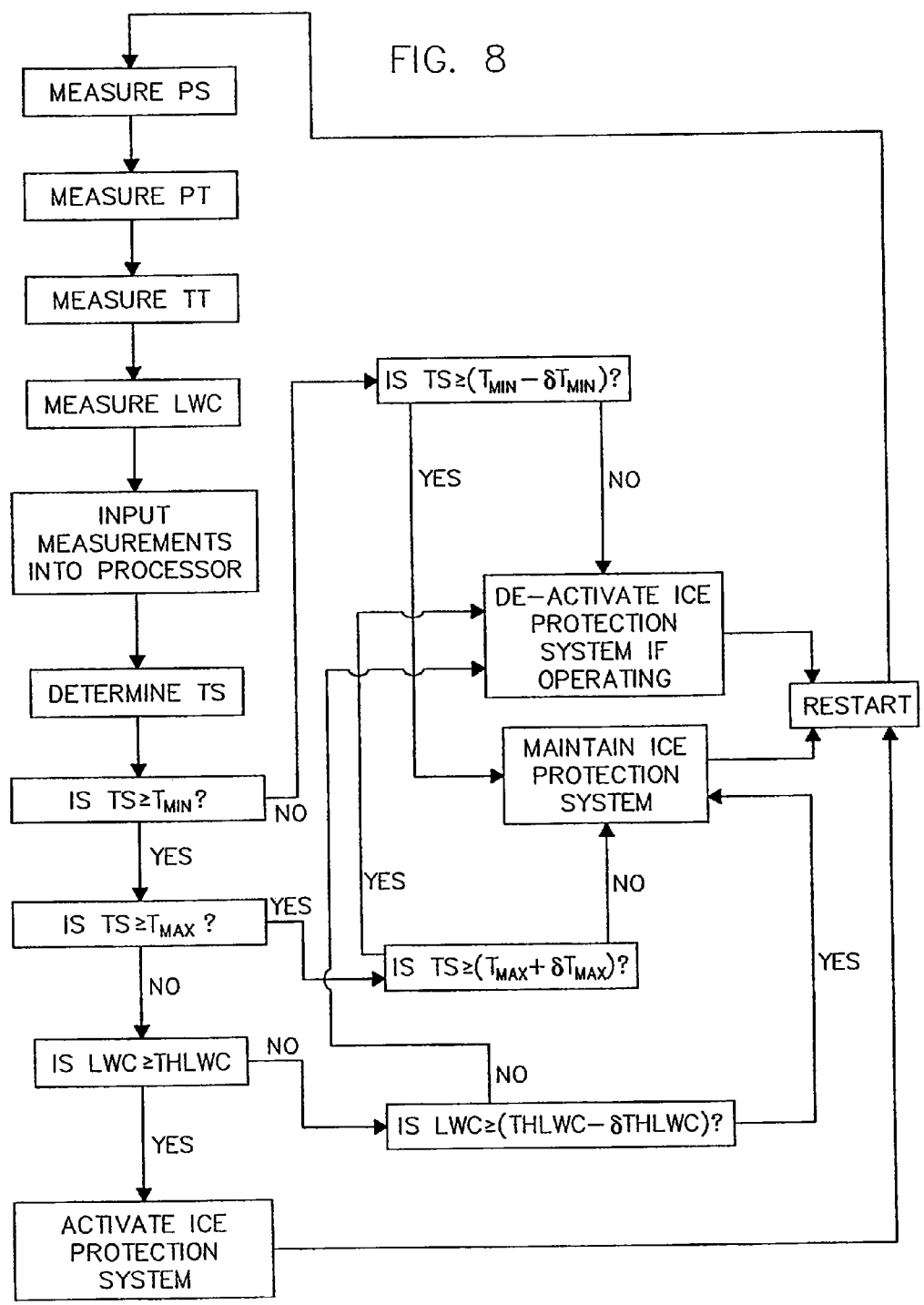

METHOD AND APPARATUS FOR DETECTING CONDITIONS CONDUCIVE TO ICE FORMATION

CROSS-REFERENCE TO RELATED APPLICATIONS

This application is a continuation of U.S. application Ser. No. 11/626,282, filed on Jan. 23, 2007, which is a divisional of U.S. application Ser. No. 10/417,309, filed on Apr. 16, 2003, which is incorporated herein in its entirety.

BACKGROUND OF THE INVENTION

The present invention relates generally to ice formation, and more specifically to a method and apparatus for detecting conditions conducive to ice formation.

During flight and while on the ground, aircraft may encounter atmospheric conditions that cause ice to form on critical flight surfaces, such as wings, stabilizers, rudders, and ailerons, propulsion system components, such as engine inlets, propellers, and engine rotors, in addition to the fuselage of the aircraft. Accumulating ice, if not removed, can add excessive weight to the aircraft and alter the aerodynamic and propulsive performance of the aircraft, possibly causing unsafe flying conditions. Even small amounts of ice on aerodynamic surfaces, such as wings, the tail, propellers, and the like, can significantly alter flight characteristics. In summary, accumulating ice may cause unsafe flying conditions.

Some known ice detection systems utilize an ice detection system to notify the flight crew of the formation of a threshold thickness of ice on a detection system sensor. In such known systems, the formation of ice on the sensor is essential for a warning signal. Therefore, such known systems respond slowly to ambient air conditions and thus warn the flight crew and/or activate ice protection systems after ice has already accumulated on surfaces of the aircraft. Additionally, such known ice detection systems may have limited utility due to differences in ambient conditions near the critical flight surfaces and the sensor. Extensive and costly flight-testing may thus be required to validate sensor location on the airframe.

SUMMARY OF THE INVENTION

In one aspect, a method is provided for detecting ambient conditions conducive to ice formation. The method includes the steps of measuring at least one parameter selected from a group of parameters consisting of a static pressure, a total pressure, a total temperature, a dew point temperature, and a liquid water content, and determining whether ambient conditions are conducive to ice formation based on the measured parameter.

In another aspect, a system is provided for detecting ambient conditions conducive to ice formation. The system includes a processor, a first sensor operatively connected to the processor and configured to measure at least one of a static pressure and a total pressure, a second sensor operatively connected to the processor and configured to measure a total temperature, and a third sensor operatively connected to the processor and configured to measure a dew point temperature. The processor is configured to determine whether ambient conditions are conducive to ice formation based on at least one parameter selected from a group of parameters consisting of the measured static pressure, the measured total pressure, the measured total temperature, and the measured dew point temperature.

In yet another aspect, an aircraft includes an airframe, a processor mounted on the airframe, a first sensor operatively connected to the processor and configured to measure at least one of a static pressure and a total pressure, a second sensor operatively connected to the processor and configured to measure a total temperature, and a third sensor operatively connected to the processor and configured to measure at least one of a dew point temperature and a liquid water content. The processor is configured to determine when ambient air conditions are conducive to ice formation on an external surface of the aircraft based on at least one parameter selected from a group of parameters consisting of the measured air static pressure, the measured air total pressure, the measured air total temperature, the measured air dew point temperature, and the measured air liquid water content.

In even another aspect, a system is provided for detecting ambient conditions conducive to ice formation. The system includes a processor, a first sensor operatively connected to the processor and configured to measure at least one of a static pressure and a total pressure, a second sensor operatively connected to the processor and configured to measure a total temperature, and a third sensor operatively connected to the processor and configured to measure a liquid water content. The processor is configured to determine whether ambient conditions are conducive to ice formation based on at least one parameter selected from a group of parameters consisting of the measured static pressure, the measured total pressure, the measured total temperature, and the measured liquid water content.

Other features of the present invention will be in part apparent and in part pointed out hereinafter.

BRIEF DESCRIPTION OF THE DRAWINGS

FIG. 8 is a flow chart illustrating an exemplary method of detecting conditions conducive to ice formation using the icing conditions detection system shown in FIGS. 1 and 2 including a liquid water content sensor.

Corresponding reference characters indicate corresponding parts throughout the several views of the drawings.

DETAILED DESCRIPTION OF THE PREFERRED EMBODIMENT

Figure 1:
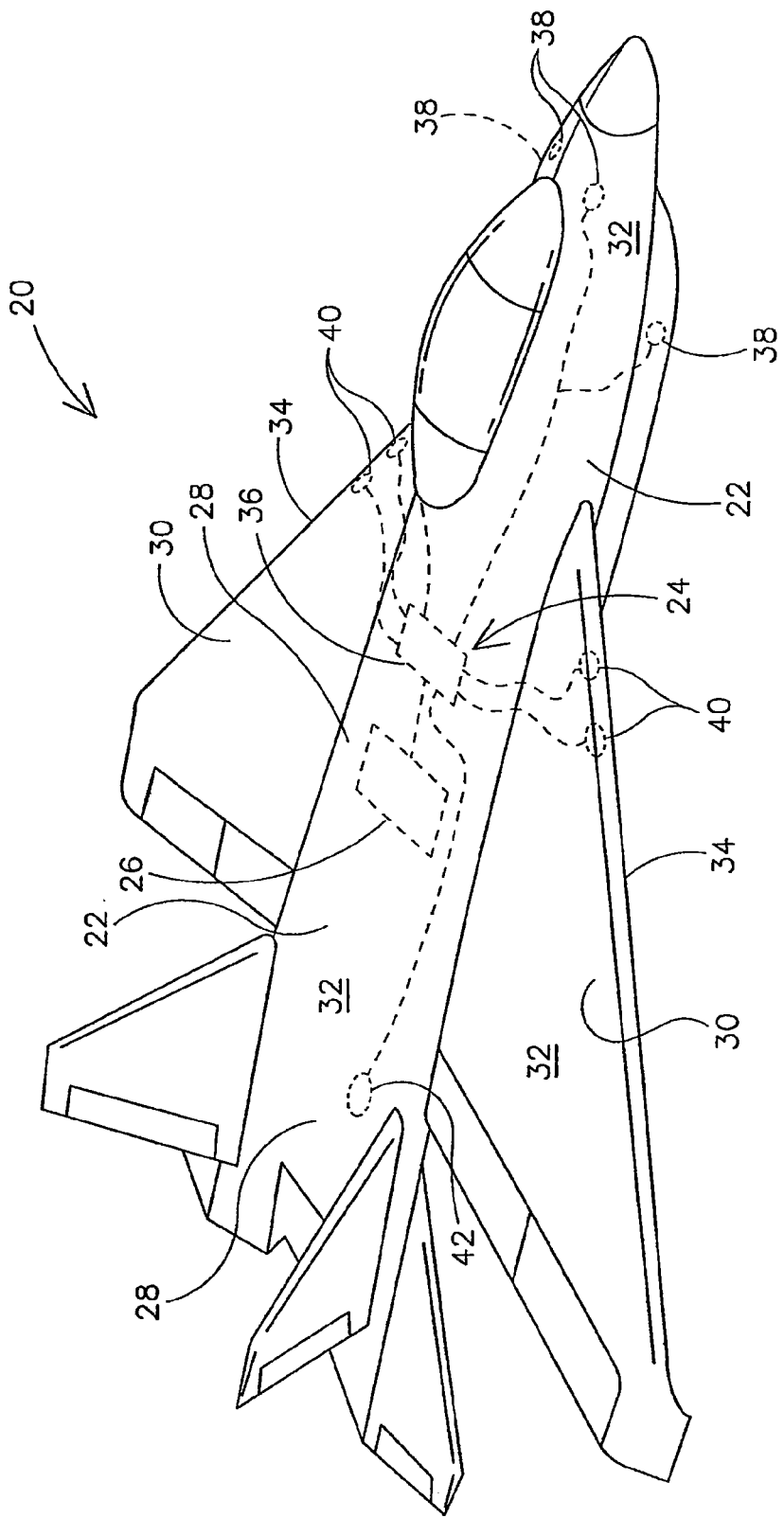
FIG. 1 is a perspective of an aircraft including an exemplary icing conditions detection system.
Figure 2:
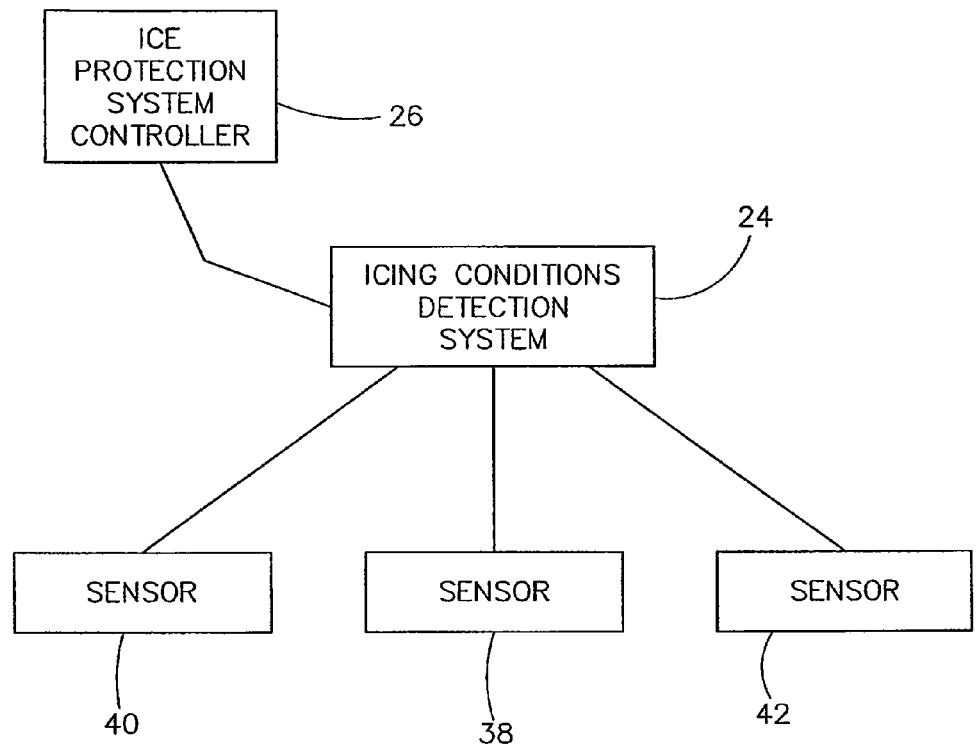
FIG. 2 is a schematic of the icing conditions detection system shown in FIG. 1 and an ice protection system for use with the aircraft shown in FIG. 1.

Referring now to the drawings, and more specifically to FIGS. 1 and 2, an aircraft is designated in its entirety by the reference numeral 20. The aircraft 20 includes an airframe 22, an icing conditions detection system (ICDS), generally designated by the reference numeral 24, and an ice protection system controller 26. The airframe 22 includes a fuselage section 28 and a pair of wings 30 extending outwardly from the fuselage 28. Both the fuselage 28 and the wings 30 are covered in a skin forming an outer surface 32 of the aircraft 20. Each wing 30 includes a leading edge 34. The ice protection system controller 26 is operatively connected to an ice protection system (not shown) to control operation of the ice protection system. The ice protection system is operatively connected to the critical sections of the aircraft outer surface 32, for example, wing leading edges 34 and engine inlet surfaces (not shown), to eliminate ice from the surface 32 in any suitable manner. It should be understood that as described herein the ice protection system may be any suitable system operative to eliminate ice in any suitable manner, such as, for example, a pneumatic thermal system, an electrical thermal system, a pneumatic boot mechanical system, and/or an electro-impulse mechanical system. The above examples of ice protection systems are exemplary only and are not intended to limit the type of ice protection system referred to herein. Additionally, it should be understood that as used herein the aircraft outer surface 32 is intended to include any surface of the aircraft 20 exposed to ambient conditions and/or susceptible to the formation of ice thereon.

Although the ice protection system controller 26 is illustrated and described herein in the exemplary manner, it should be understood that the ice protection system controller 26 may be mounted on the airframe 22 anywhere and in any suitable manner, with respect to the airframe 22 and the outer surface 32, facilitating operating the ice protection system to eliminate ice from any portion of the outer surface 32.

The ICDS 24 includes a processor 36 mounted on the airframe 22 and operatively connected to the ice protection system controller 26, and a plurality of sensor modules 38, 40, 42 mounted on the airframe 22 and operatively connected to the processor 36. More specifically, in the exemplary embodiments, each sensor module 38, 40, 42 is mounted on the airframe structures (not shown) such that each module 38, 40, 42 provides measurement of a predetermined parameter or parameters within a predetermined accuracy. Although the sensor modules 38, 40, 42 are illustrated and described herein in the exemplary manner, it should be understood that the airframe 22 may include any number of sensor modules operatively configured to measure any desired parameter, and it should also be understood that such sensor modules may be mounted on the airframe 22 anywhere and in any suitable manner, with respect to the airframe 22 and the outer surface 32, facilitating measurement of the selected parameter within a predetermined accuracy. For example, in one embodiment (not shown), one or more of the sensors 38, 40, 42 are mounted on the airframe such that the sensor(s) protrudes in the free-stream.

In an exemplary embodiment, the sensor 38 is a conventional pressure sensor 38 configured to measure a static pressure (PS) and a total pressure (PT), the sensor 40 is a conventional temperature sensor 40 configured to measure a total temperature (TT), and the sensor 42 is a conventional dew point sensor 42 configured to measure a dew point temperature (TD). In one embodiment, the conventional pressure sensor 38 is a pitot-static pressure sensor. The dew point sensor 42 may be any suitable sensor type, for example, optical, acoustic, or capacitive. In one embodiment, the dew point sensor 42 is a hygrometer. In another embodiment, the dew point sensor 42 is a DewPro® MMY 35 dew point transmitter, commercially available from General Eastern Instruments Corporation of Woburn, Mass. In an alternative exemplary embodiment, the sensor 42 is a liquid water content sensor 42 configured to measure ambient air liquid water content (LWC). The liquid water content sensor 42 may be any suitable sensor type, for example, optical, acoustic, or capacitive. In an alternative embodiment, the detection system 24 includes separate sensor modules (not shown) for measuring static pressure PS and total pressure PT. Further, in yet another alternative embodiment (not shown), the detection system 24 includes both a dew point temperature sensor and a liquid water content sensor. Any of the sensor modules 38, 40, 42 may be designated herein as a first, a second, a third, and/or a fourth sensor. The pressure sensor 38 and temperature sensor 40 are well known in the art and therefore will not be discussed in more detail herein.

In an alternative embodiment (not shown), the detection system 24 may include other sensor types configured to measure ambient air moisture conditions (either by direct measurement or by explicit or empirical computational methods using the ambient static pressure PS, total pressure PT, and/or total temperature TT) in addition to, or in alternative to, a dew point temperature sensor and/or a liquid water content sensor, such as, for example, a sensor module configured to measure water vapor pressure in ambient air, a sensor module configured to measure relative humidity, and/or a sensor module configured to measure specific moisture content. These other sensor types configured to measure ambient air moisture conditions are conventional and well known to those experienced in the science of psychometrics, and therefore will not be discussed in more detail herein. Any of these other sensor modules configured to measure ambient air moisture conditions may be designated herein as a first, a second, a third, and/or a fourth sensor.

Figure 3:
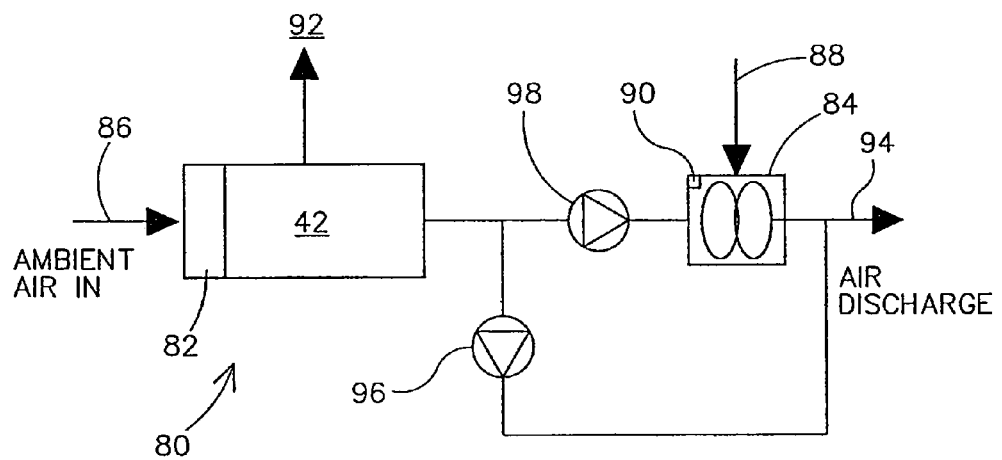
FIG. 3 is a schematic of a sensor system for use with the detection system shown in FIGS. 1 and 2.

FIG. 3 is a schematic of a sensor system 80 for use with the icing conditions detection system 24 (FIGS. 1 and 2). More specifically, FIG. 3 illustrates one embodiment of a sensor system 80 for measuring ambient moisture conditions, such as, for example, dew point temperature, liquid water content, vapor pressure, relative humidity, and/or specific moisture content. The system 80 is mounted on the airframe 22 (FIG. 1) and includes the sensor 42, a filter 82, a sampling pump 84, and a heated inlet 86 in fluid communication with ambient air adjacent the aircraft 20 (FIG. 1). In one embodiment, the filter 82 is a centrifuge type filter. The sampling pump 84 is operatively connected to the processor 36 (FIGS. 1 and 2) and receives an input 88 from a ground/air switch 90. It should be understood that the ground/air switch may be replaced with any suitable device configured to indicate whether the aircraft 20 is on the ground or in flight. When the aircraft 20 is on the ground, the switch 90 facilitates operation of the sampling pump 84 such that the pump 84 draws ambient air through the heated inlet 86. The air drawn through the heated inlet 86 travels through the filter 82 to the sensor 42. The heated inlet 86 vaporizes liquid water present in the air drawn therethrough. The filter 82 removes contaminants from the air such that clean air is delivered to the sensor 42. The sensor 42 outputs 92 the measured moisture condition parameter of the ambient air to the processor 36. When the aircraft 20 is on the ground, the ambient air discharges from the sensor 42 and flows through a check valve 98, the pump 84, and discharges through an outlet 94. When the aircraft 20 is in flight, the switch 90 suspends operation of the sampling pump 84, the sensor 42 receives ambient air from the heated inlet 86 as a result of ram air pressure, and the ambient air discharges from the sensor 42, flows through a check valve 96, and discharges through the outlet 94. In one embodiment, the ambient air flows through the sensor 42 at a rate between about 0.25 standard cubic feet per hour and about 5.5 standard cubic feet per hour. Additionally, in one embodiment, the system 80 includes a suitable flow control device (not shown) such as a pressure regulator to control the flow rate of air through the sensor 42.

Figure 4:
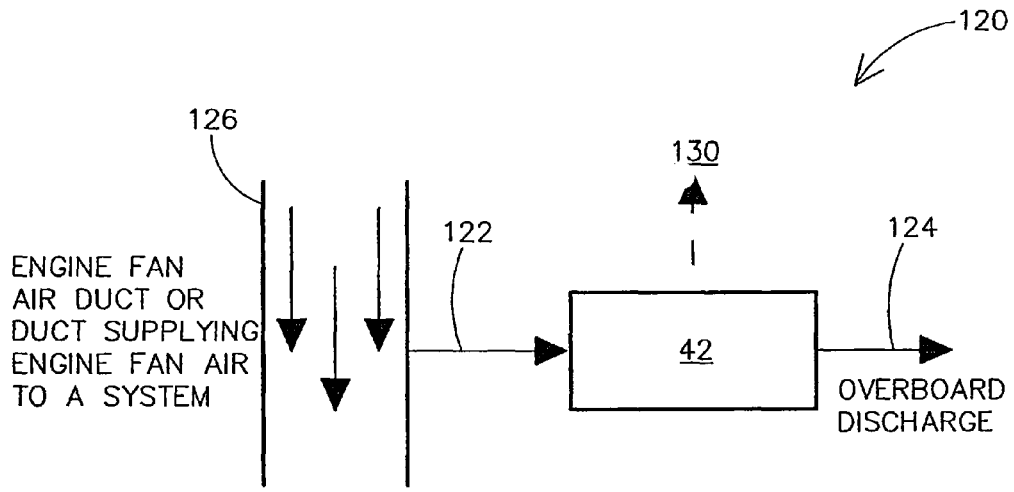
FIG. 4 is a schematic of an alternative sensor system for use with the detection system shown in FIGS. 1 and 2.

FIG. 4 is a schematic of an alternative sensor system 120 for use with the icing conditions detection system 24 (FIGS. 1 and 2). More specifically, FIG. 4 illustrates an alternative embodiment of a sensor system 120 for measuring ambient moisture conditions, such as, for example, dew point temperature, liquid water content, vapor pressure, relative humidity, and/or specific moisture content. The system 120 is mounted on the airframe 22 (FIG. 1) and includes the sensor 42, a heated inlet 122, and an outlet 124. The heated inlet 122 is in fluid communication with a duct 126 contained in the aircraft 20 (FIG. 1). For example, the duct 126 may be a core engine bypass (fan air) or an engine bleed air duct. The aircraft 20 includes an engine (not shown) mounted on the airframe 22. The engine includes a fan (not shown). At least a portion of the air passing through the fan travels through the duct 126. In one embodiment, the system 120 includes a filter (not shown) for removing contaminants from the fan air so clean air is delivered to the sensor 42. The sensor 42 receives the fan air from the heated inlet 122 and outputs 130 the measured moisture condition parameter of the air to the processor 36 (FIGS. 1 and 2). The heated inlet 122 vaporizes liquid water present in the air. The air received by the sensor 42 discharges through the outlet 124.

Figure 5:
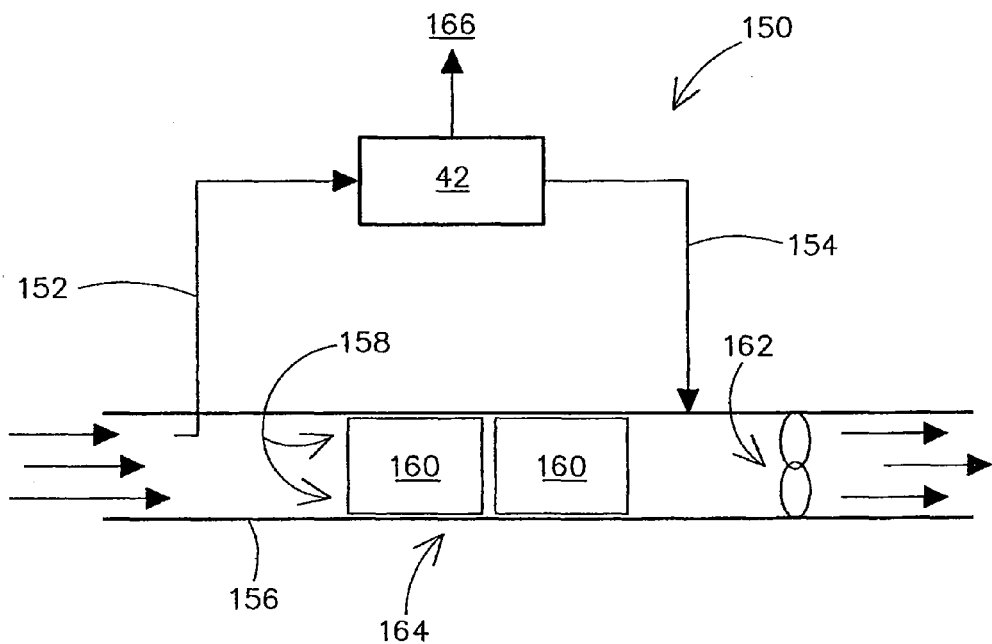
FIG. 5 is a schematic of another alternative sensor system for use with the detection system shown in FIGS. 1 and 2.

FIG. 5 is a schematic of another alternative sensor system 150 for use with the icing conditions detection system 24 (FIGS. 1 and 2). More specifically, FIG. 5 illustrates another alternative embodiment of a sensor system 150 for measuring ambient moisture conditions, such as, for example, dew point temperature, liquid water content, vapor pressure, relative humidity, and/or specific moisture content. The system 150 is mounted on the airframe 22 (FIG. 1) and includes the sensor 42, a heated inlet 152, and an outlet 154. The aircraft 20 (FIG. 1) includes an air-conditioning system 164 mounted on the airframe 22 for providing air-conditioned air for passenger, crew, and equipment conditioning of the aircraft 20. The heated inlet 152 is in fluid communication with an air-conditioning system ram air duct 156 contained within the air-conditioning system 164 and carries a flow of ambient air. The heated inlet 152 is in fluid communication with the duct 156 upstream from a condensed moisture spray nozzle system 158, a plurality of heat exchangers 160, and a fan 162, each positioned within the duct 156 as illustrated in FIG. 5. The outlet 154 is in fluid communication with the duct 156 downstream from the nozzle system 158 and the heat exchangers 160, and upstream from the fan 162. In one embodiment, the system 150 includes a filter (not shown) for removing contaminants from the air such that clean air is provided to the sensor 42. The sensor 42 receives air from the duct 156 through the heated inlet 152, and outputs 166 the measured moisture condition parameter of the air to the processor 36 (FIGS. 1 and 2). The air discharges through the outlet 154 back into the duct 156. In one embodiment, the fan 162 is one of an electrical, a pneumatic, and an air-cycle fan.

Figure 6:
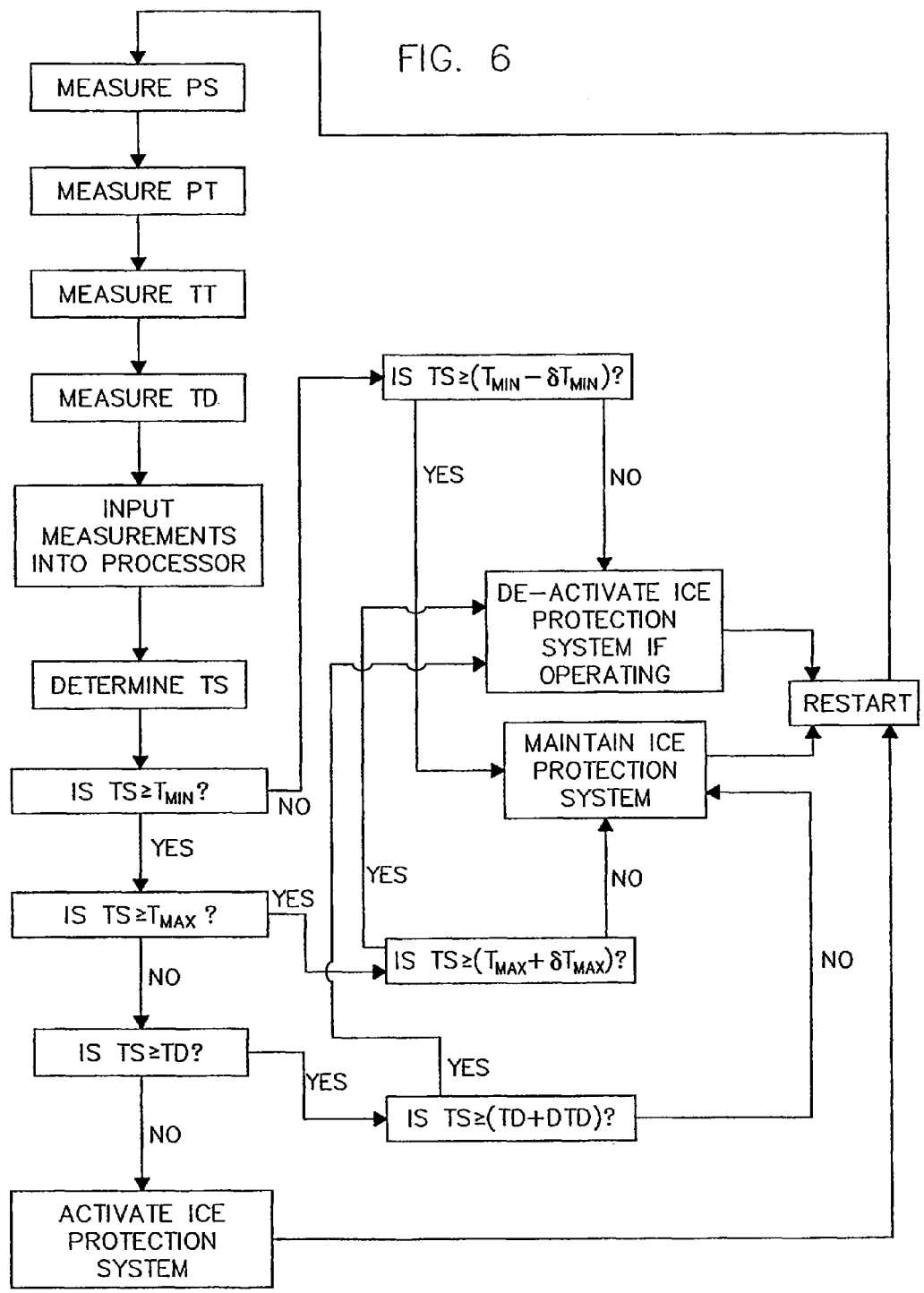
FIG. 6 is a flow chart illustrating an exemplary method of detecting conditions conducive to ice formation using the icing conditions detection system shown in FIGS. 1 and 2 including a dew point temperature sensor.

FIG. 6 is a flow chart illustrating an exemplary method of detecting conditions conducive to ice formation on the aircraft surface 32 (FIG. 1) using the icing conditions detection system 24 (FIGS. 1 and 2), wherein ambient air moisture conditions are determined using a dew point temperature sensor 42 (FIGS. 1 and 2). The method includes measuring the static pressure PS of ambient air adjacent the aircraft 20 using the pressure sensor 38, measuring the total pressure PT of the ambient air adjacent the aircraft 20 using the pressure sensor 38, measuring the total temperature TT of the ambient air adjacent the aircraft 20 using the temperature sensor 40, and measuring the dew point temperature TD of the ambient air adjacent the aircraft 20 using the dew point temperature sensor 42. The PS, PT, TT, and TD measurements are input into the processor 36 (FIGS. 1 and 2) from the respective sensors 38, 40, 42. The processor 36 determines the static temperature (TS) of the ambient air adjacent the aircraft 20. In one embodiment, the processor 36 calculates the static temperature TS using the measured static pressure PS, the measured total pressure PT, and the measured total temperature TT. Furthermore, in one embodiment, the processor 36 calculates the static temperature TS using the following relationships between the measured static pressure PS, the measured total pressure PT, and the measured total temperature TT:

$$\frac{PT}{PS} = \left[1 + \frac{\gamma-1}{2}M^2\right]^{\frac{\gamma}{\gamma-1}}; \tag{1}$$

wherein γ=ratio of specific heats at constant pressure and constant volume;
for air, γ=1.4;

$$\frac{PT}{PS} = [1 + 0.2M^2]^{3.5}; \tag{2}$$

$$\left(\frac{PT}{PS}\right)^{\frac{1}{3.5}} = 1 + 0.2M^2; \tag{3}$$

$$\frac{TT}{TS} = 1 + \frac{\gamma-1}{2}M^2; \tag{4}$$

wherein TT and TS are in degrees Rankine;
for air, γ=1.4;

$$\frac{TT}{TS} = 1 + 0.2M^2; \tag{5}$$

$$\frac{TT}{TS} = \left(\frac{PT}{PS}\right)^{0.2857}; \tag{6}$$

and $$TS = \left(\frac{TT}{\left(\frac{PT}{PS}\right)^{0.2857}}\right). \tag{7}$$

Figure 7:
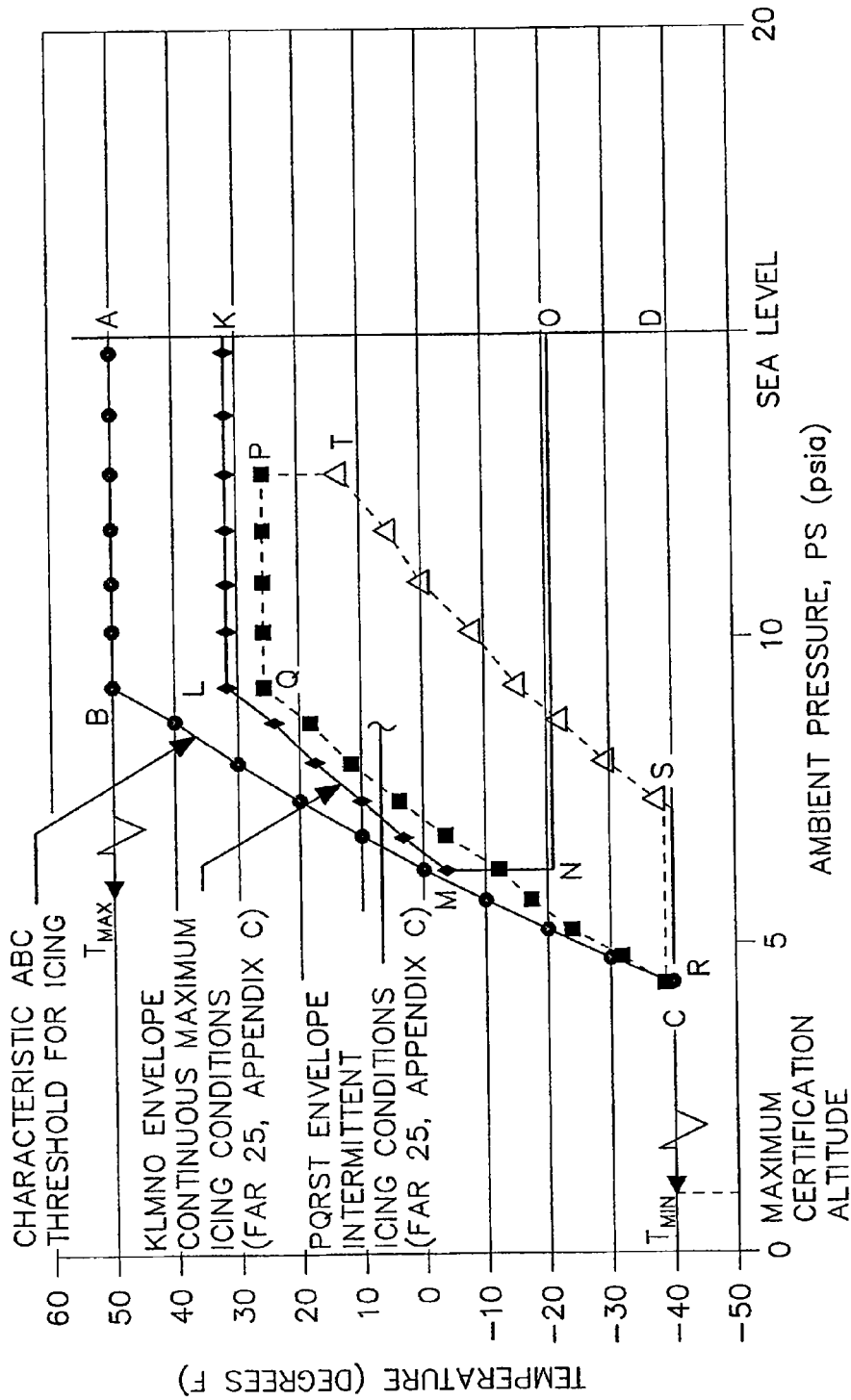
FIG. 7 is a graph illustrating the Federal Aviation Regulations Part 25 Appendix C atmospheric icing conditions in terms of temperature versus ambient static pressure.

The processor 36 uses the determined static temperature TS to determine if the ambient temperature conditions are conducive to ice formation. More specifically, the processor 36 compares the determined static temperature TS with a minimum temperature for icing ($T_{min}$) and a maximum temperature for icing ($T_{max}$). As described below, if the processor 36 determines the determined static temperature TS is outside the defined temperature limits of $T_{min}$ and $T_{max}$, the processor 36 concludes the ambient air static temperature TS is not conducive to ice formation and determines if the ice protection system, if operating, should be de-activated. FAR Part 25 Appendix C indicates that in continuous maximum (stratiform clouds) atmospheric icing conditions, icing can occur at temperatures up to 32° F. from sea level to 12,000 feet (9.35 psia) and at decreasing temperatures from 32° F. to −4° F. for altitudes from 12,000 feet (9.35 psia) to 22,000 feet (6.21 psia). FAR Part 25 Appendix C also indicates that in the intermittent maximum (cumuliform clouds) atmospheric icing conditions, icing can occur at temperatures up to 26° F. for altitudes from sea level to 12,000 feet (9.35 psia) and at decreasing temperatures from 26° F. to −40° F. for altitudes from 12,000 feet (9.35 psia) to 29,000 feet (4.57 psia). FIG. 7 is a graph illustrating the FAR Part 25 Appendix C icing temperature and pressure boundaries for both continuous maximum and intermittent maximum atmospheric icing conditions in terms of temperature versus ambient static pressure PS. FIG. 7 also illustrates the ambient static temperature TS (envelope ABCD) used by the processor 36.

In the exemplary embodiments, the $T_{min}$ and $T_{max}$ are pre-selected as constants, wherein $T_{min}$ is selected as −40° F. and $T_{max}$ is selected as +50° F. It should be understood that constant values for the $T_{min}$ and $T_{max}$ other than those exemplified herein may be used. In an alternative embodiment, the $T_{min}$ and $T_{max}$ are defined as a function of ambient static pressure PS. In one alternative embodiment, the processor 36 determines the $T_{min}$ and the $T_{max}$ for the measured static pressure PS using a table, similar to FIG. 7, stored in the processor 36, or alternatively a memory (not shown) operatively connected to the processor 36, and plots the $T_{min}$ and $T_{max}$ versus ambient static pressure PS. In another alternative embodiment, the processor 36 determines the $T_{min}$ and $T_{max}$ for the measured static pressure PS using a mathematical relationship stored in the processor 36, or alternatively a memory (not shown) operatively connected to the processor 36, that calculates the $T_{min}$ and $T_{max}$ as a function of ambient static pressure PS.

As discussed above, the processor 36 compares the determined static temperature TS with the $T_{min}$. If the processor determines the determined static temperature TS is less than the $T_{min}$, the processor 36 concludes the ambient air static temperature, and more specifically the determined static temperature TS, is not conducive to ice formation, and determines if the ice protection system (not shown), if operating, should be de-activated. In one embodiment, when the processor 36 concludes the ambient air static temperature is not conducive to ice formation, the processor 36 sends an advisory signal to notify the aircraft flight crew the ambient air temperature is not conducive to ice formation. To determine if the ice protection system should be deactivated, the processor 36 compares the determined static temperature TS to the difference between the $T_{min}$ and a dead-band minimum temperature value ($\delta T_{min}$). The $\delta T_{min}$ provides increased safety and prevents cyclic activation and de-activation of the ice protection system when the ambient air temperature, and more specifically the determined static temperature TS, is marginally conducive to ice formation. If the processor 36 determines that the determined static temperature TS is less than the difference between the $T_{min}$ and the $\delta T_{min}$, the processor 36 sends an output signal to the ice protection system controller 26 to de-activate the ice protection system if it is operating, and the processor re-starts the method beginning with measuring the static pressure PS, the total pressure PT, the total temperature TT, and the dew point temperature TD of the ambient air. In one embodiment, when the ice protection system has been de-activated, the processor 36 sends an advisory signal to notify the aircraft flight crew the ice protection system has been de-activated.

If the processor 36 determines the determined static temperature TS is greater than or equal to the difference between the $T_{min}$ and the $\delta T_{min}$, the processor 36 maintains the operating status of the ice protection system and re-starts the method beginning with measuring the static pressure PS, the total pressure PT, the total temperature TT, and the dew point temperature TD of the ambient air. In one embodiment, when the processor 36 maintains the operating status of the ice protection system, the processor 36 sends an advisory signal to notify the aircraft flight crew that the operating status of the ice protection system is being maintained.

If the processor 36 determines the determined static temperature TS is greater than or equal to the $T_{min}$, the processor 36 concludes the ambient air static temperature, and more specifically the determined static temperature TS, is conducive to ice formation. In one embodiment, when the processor 36 concludes the ambient air temperature is conducive to ice formation, the processor 36 sends an advisory signal to notify the aircraft flight crew that the ambient air temperature is conducive to ice formation.

As discussed above, the processor 36 then compares the determined static temperature TS with the $T_{max}$. If the processor determines the determined static temperature TS is greater than or equal to the $T_{max}$, the processor 36 concludes the ambient air static temperature, and more specifically the determined static temperature TS, is not conducive to ice formation, and determines if the ice protection system, if operating, should be de-activated. In one embodiment, when the processor 36 concludes the ambient air static temperature is not conducive to ice formation, the processor 36 sends an advisory signal to notify the aircraft flight crew the ambient air temperature is not conducive to ice formation. To determine if the ice protection system should be deactivated, the processor 36 compares the determined static temperature TS to the combination of the $T_{max}$ and a dead-band maximum temperature value ($\delta T_{max}$). The $\delta T_{max}$ provides increased safety and prevents cyclic activation and de-activation of the ice protection system when the ambient air temperature, and more specifically the determined static temperature TS, is marginally conducive to ice formation. If the processor 36 determines that the determined static temperature TS is greater than or equal to the combination of the $T_{max}$ and the $\delta T_{max}$, the processor 36 sends an output signal to the ice protection system controller 26 to de-activate the ice protection system if it is operating, and the processor re-starts the method beginning with measuring the static pressure PS, the total pressure PT, the total temperature TT, and the dew point temperature TD of the ambient air. In one embodiment, when the ice protection system has been de-activated, the processor 36 sends an advisory signal to notify the aircraft flight crew the ice protection system has been de-activated.

If the processor 36 determines the determined static temperature TS is less than the combination of the $T_{max}$ and the $\delta T_{max}$, the processor 36 maintains the operating status of the ice protection system and re-starts the method beginning with measuring the static pressure PS, the total pressure PT, the total temperature TT, and the dew point temperature TD of the ambient air. In one embodiment, when the processor 36 maintains the operating status of the ice protection system, the processor 36 sends an advisory signal to notify the aircraft flight crew that the operating status of the ice protection system is being maintained.

If the processor 36 determines the determined static temperature TS is less than the $T_{max}$, the processor 36 concludes the ambient air static temperature, and more specifically the determined static temperature TS, is conducive to ice formation. In one embodiment, when the processor 36 concludes the ambient air temperature is conducive to ice formation, the processor 36 sends an advisory signal to notify the aircraft flight crew that the ambient air temperature is conducive to ice formation.

In the exemplary embodiments, the dead-band temperature values $\delta T_{min}$ and $\delta T_{max}$ are pre-selected as constants, wherein the $\delta T_{min}$ is selected as 2° F. and the $\delta T_{max}$ is selected as 5° F. It should be understood that constant values for the $\delta T_{min}$ and the $\delta T_{max}$ other than those exemplified herein may be used. In an alternative embodiment, the dead-band temperature values $\delta T_{min}$ and $\delta T_{max}$ are defined as a function of ambient conditions, and more specifically ambient static pressure PS.

The processor 36 then determines whether the ambient humidity conditions are conducive to ice formation. More specifically, the processor 36 compares the determined static temperature TS with the measured dew point temperature TD. If the processor 36 determines the determined static temperature TS is greater than or equal to the measured dew point temperature TD, the processor 36 concludes the ambient air humidity is not conducive to ice formation, and determines if the ice protection system, if operating, should be de-activated. In one embodiment, when the processor 36 concludes the ambient air humidity is not conducive to ice formation, the processor 36 sends an advisory signal to notify the aircraft flight crew that the ambient air humidity is not conducive to ice formation. To determine if the ice protection system should be deactivated, the processor 36 compares the determined static temperature TS to the combination of the measured dew point temperature TD and a dead-band dew point value (DTD). The dead-band dew point value DTD provides additional safety and prevents cyclic activation and de-activation of the ice protection system when the ambient air humidity is marginally conducive to ice formation. If the processor 36 determines the determined static temperature TS is greater than or equal to the combination of the measured dew point temperature TD and the dead-band dew point value DTD, the processor 36 sends an output signal to the ice protection system controller 26 to de-activate the ice protection system if it is operating, and the processor 36 re-starts the method beginning with measuring the static pressure PS, the total pressure PT, the total temperature TT, and the dew point temperature TD of the ambient air. In one embodiment, when the ice protection system has been de-activated, the processor 36 sends an advisory signal to notify the aircraft flight crew the ice protection system has been de-activated.

In one embodiment, the dead-band dew point value DTD is pre-selected as a constant. In an alternative embodiment, the dead-band dew point value DTD is defined as a function of ambient conditions, and more specifically ambient static pressure PS or ambient dew point temperature TD. Additionally, in one embodiment, the dead-band dew point value DTD is pre-selected to provide a dead-band of 3.0° F.

If the processor 36 determines that the determined static temperature TS is less than the combination of the measured dew point temperature TD and the dead-band dew point value DTD, the processor 36 maintains the operating status of the ice protection system and re-starts the method beginning with measuring the static pressure PS, the total pressure PT, the total temperature TT, and the dew point temperature TD of the ambient air. In one embodiment, when the processor 36 maintains the operating status of the ice protection system, the processor 36 sends an advisory signal to notify the aircraft flight crew the operating status of the ice protection system is being maintained.

If the processor 36 determines that the determined static temperature TS is less than the measured dew point temperature TD, the processor 36 concludes the ambient conditions, including the ambient air humidity, are conducive to ice formation. The processor 36 then sends an output signal to the ice protection system controller 26 that activates the ice protection system. In one embodiment, when ambient conditions are conducive to ice formation, the processor 36 sends an advisory signal to notify the aircraft flight crew the ambient conditions are conducive to ice formation. Additionally, in one embodiment, when the processor 36 has activated the ice protection system, the processor 36 sends an advisory signal to notify the aircraft flight crew the ice protection system has been activated. The method then re-starts, beginning with measuring the static pressure PS, the total pressure PT, the total temperature TT, and the dew point temperature TD of the ambient air, to re-evaluate ambient air conditions.

FIG. 8 is a flow chart illustrating an alternative exemplary method of detecting conditions conducive to ice formation on the aircraft surface 32 (FIG. 1) using the icing conditions detection system 24 (FIGS. 1 and 2), wherein ambient air moisture conditions are determined using a liquid water content sensor 42 (FIGS. 1 and 2). The method includes measuring the static pressure PS of ambient air adjacent the aircraft 20 using the pressure sensor 38, measuring the total pressure PT of the ambient air adjacent the aircraft 20 using the pressure sensor 38, measuring the total temperature TT of the ambient air adjacent the aircraft 20 using the temperature sensor 40, and measuring the liquid water content LWC of the ambient air adjacent the aircraft 20 using the liquid water content sensor 42. The PS, PT, TT, and LWC measurements are input into the processor 36 (FIGS. 1 and 2) from the respective sensors 38, 40, 42.

The processor 36 determines the static temperature TS of the ambient air adjacent the aircraft 20. In one embodiment, the processor 36 calculates the static temperature TS using the measured static pressure PS, the measured total pressure PT, and the measured total temperature TT. The processor 36 uses the determined static temperature TS to determine if the ambient temperature conditions are conducive to ice formation. More specifically, the processor 36 compares the determined static temperature TS with a minimum temperature for icing ($T_{min}$) and a maximum temperature for icing ($T_{max}$). As described below, if the processor 36 determines the determined static temperature TS is outside the defined temperature limits of $T_{min}$ and $T_{max}$, the processor 36 concludes the ambient air static temperature TS is not conducive to ice formation and determines if the ice protection system, if operating, should be de-activated. FIG. 7 is a graph illustrating the FAR Part 25 Appendix C icing temperature and pressure boundaries for both continuous maximum and intermittent maximum atmospheric icing conditions in terms of temperature versus ambient static pressure PS. FIG. 7 also illustrates the ambient static temperature TS (envelope ABCD) used by the processor 36.

In the exemplary embodiments, the $T_{min}$ and $T_{max}$ are pre-selected as constants, wherein $T_{min}$ is selected as 40° F. and $T_{max}$ is selected as +50° F. It should be understood that constant values for the $T_{min}$ and $T_{max}$ other than those exemplified herein may be used. In an alternative embodiment, the $T_{min}$ and $T_{max}$ are defined as a function of ambient static pressure PS. In one alternative embodiment, the processor 36 determines the $T_{min}$ and the $T_{max}$ for the measured static pressure using a table, similar to FIG. 7, stored in the processor 36, or alternatively a memory (not shown) operatively connected to the processor 36, and plots the $T_{min}$ and $T_{max}$ versus ambient static pressure PS. In another alternative embodiment, the processor 36 determines the $T_{min}$ and $T_{max}$ for the measured static pressure PS using a mathematical relationship stored in the processor 36, or alternatively a memory (not shown) operatively connected to the processor 36, that calculates the $T_{min}$ and $T_{max}$ as a function of ambient static pressure PS.

As discussed above, the processor 36 compares the determined static temperature TS with the $T_{min}$. If the processor determines the determined static temperature TS is less than the $T_{min}$, the processor 36 concludes the ambient air static temperature, and more specifically the determined static temperature TS, is not conducive to ice formation, and determines if the ice protection system (not shown), if operating, should be de-activated. In one embodiment, when the processor 36 concludes the ambient air static temperature is not conducive to ice formation, the processor 36 sends an advisory signal to notify the aircraft flight crew the ambient air temperature is not conducive to ice formation. To determine if the ice protection system should be deactivated, the processor 36 compares the determined static temperature TS to the difference between the $T_{min}$ and a dead-band minimum temperature value ($\delta T_{min}$). The $\delta T_{min}$ provides increased safety and prevents cyclic activation and de-activation of the ice protection system when the ambient air temperature, and more specifically the determined static temperature TS, is marginally conducive to ice formation. If the processor 36 determines that the determined static temperature TS is less than the difference between the $T_{min}$ and the $\delta T_{min}$, the processor 36 sends an output signal to the ice protection system controller 26 to de-activate the ice protection system if it is operating, and the processor re-starts the method beginning with measuring the static pressure PS, the total pressure PT, the total temperature TT, and the dew point temperature TD of the ambient air. In one embodiment, when the ice protection system has been de-activated, the processor 36 sends an advisory signal to notify the aircraft flight crew the ice protection system has been de-activated.

If the processor 36 determines the determined static temperature TS is greater than or equal to the difference between the $T_{min}$ and the $\delta T_{min}$, the processor 36 maintains the operating status of the ice protection system and re-starts the method beginning with measuring the static pressure PS, the total pressure PT, the total temperature TT, and the dew point temperature TD of the ambient air. In one embodiment, when the processor 36 maintains the operating status of the ice protection system, the processor 36 sends an advisory signal to notify the aircraft flight crew that the operating status of the ice protection system is being maintained.

If the processor 36 determines the determined static temperature TS is greater than or equal to the $T_{min}$, the processor 36 concludes the ambient air static temperature, and more specifically the determined static temperature TS, is conducive to ice formation. In one embodiment, when the processor 36 concludes the ambient air temperature is conducive to ice formation, the processor 36 sends an advisory signal to notify the aircraft flight crew that the ambient air temperature is conducive to ice formation.

As discussed above, the processor 36 then compares the determined static temperature TS with the $T_{max}$. If the processor determines the determined static temperature TS is greater than or equal to the $T_{max}$, the processor 36 concludes the ambient air static temperature, and more specifically the determined static temperature TS, is not conducive to ice formation, and determines if the ice protection system, if operating, should be de-activated. In one embodiment, when the processor 36 concludes the ambient air static temperature is not conducive to ice formation, the processor 36 sends an advisory signal to notify the aircraft flight crew the ambient air temperature is not conducive to ice formation. To determine if the ice protection system should be de-activated, the processor 36 compares the determined static temperature TS to the combination of the $T_{max}$ and a dead-band maximum temperature value ($\delta T_{max}$). The $\delta T_{max}$ provides increased safety and prevents cyclic activation and de-activation of the ice protection system when the ambient air temperature, and more specifically the determined static temperature TS, is marginally conducive to ice formation. If the processor 36 determines that the determined static temperature TS is greater than or equal to the combination of the $T_{max}$ and the $\delta T_{max}$, the processor 36 sends an output signal to the ice protection system controller 26 to de-activate the ice protection system if it is operating, and the processor re-starts the method beginning with measuring the static pressure PS, the total pressure PT, the total temperature TT, and the dew point temperature TD of the ambient air. In one embodiment, when the ice protection system has been de-activated, the processor 36 sends an advisory signal to notify the aircraft flight crew the ice protection system has been de-activated.

If the processor 36 determines the determined static temperature TS is less than the combination of the $T_{max}$ and the $\delta T_{max}$, the processor 36 maintains the operating status of the ice protection system and re-starts the method beginning with measuring the static pressure PS, the total pressure PT, the total temperature TT, and the dew point temperature TD of the ambient air. In one embodiment, when the processor 36 maintains the operating status of the ice protection system, the processor 36 sends an advisory signal to notify the aircraft flight crew that the operating status of the ice protection system is being maintained.

If the processor 36 determines the determined static temperature TS is less than the $T_{max}$, the processor 36 concludes the ambient air static temperature, and more specifically the determined static temperature TS, is conducive to ice formation. In one embodiment, when the processor 36 concludes the ambient air temperature is conducive to ice formation, the processor 36 sends an advisory signal to notify the aircraft flight crew that the ambient air temperature is conducive to ice formation.

In the exemplary embodiments, the dead-band temperature values $\delta T_{min}$ and $\delta T_{max}$ are pre-selected as constants, wherein the $\delta T_{min}$ is selected as 2° F. and the $\delta T_{max}$ is selected as 5° F. It should be understood that constant values for the $\delta T_{min}$ and the $\delta T_{max}$ other than those exemplified herein may be used. In an alternative embodiment, the dead-band temperature values $\delta T_{min}$ and $\delta T_{max}$ are defined as a function of ambient conditions, and more specifically ambient static pressure PS.

The processor 36 then determines whether the ambient humidity conditions are conducive to ice formation. More specifically, the processor 36 compares the measured liquid water content LWC with a threshold liquid water content for icing (THLWC). In the exemplary embodiment, the threshold liquid water content for icing (THLWC) is pre-selected as a constant, wherein the threshold liquid water content for icing THLWC is selected as 0.02 grams/cubic meter. It should be understood that constant values for the threshold liquid water content for icing THLWC other than the value exemplified herein may be used. In an alternative embodiment, the threshold liquid water content for icing THLWC is defined as a function of ambient static pressure PS. In one alternative embodiment, the processor 36 determines the threshold liquid water content for icing THLWC for the measured static pressure PS using a table, similar to FIG. 7, stored in the processor 36, or alternatively a memory (not shown) operatively connected to the processor 36, and plots the threshold liquid water content for icing THLWC versus ambient static pressure PS. In another alternative embodiment, the processor 36 determines the threshold liquid water content for icing THLWC for the measured static pressure PS using a mathematical relationship stored in the processor 36, or alternatively a memory (not shown) operatively connected to the processor 36, that calculates the threshold liquid water content for icing THLWC as a function of ambient static pressure PS.

If the processor 36 determines the measured liquid water content LWC is less the threshold liquid water content for icing THLWC, the processor 36 concludes the ambient air humidity is not conducive to ice formation, and determines if the ice protection system, if operating, should be de-activated.

In one embodiment, when the processor 36 concludes the ambient air humidity is not conducive to ice formation, the processor 36 sends an advisory signal to notify the aircraft flight crew that the ambient air humidity is not conducive to ice formation. To determine if the ice protection system should be deactivated, the processor 36 compares the measured liquid water content LWC to the difference between the threshold liquid water content for icing THLWC and a dead-band threshold liquid water content for icing (δTHLWC). The dead-band threshold liquid water content for icing δTHLWC provides additional safety and prevents cyclic activation and de-activation of the ice protection system when the ambient air humidity is marginally conducive to ice formation.

In the exemplary embodiment, the dead-band threshold liquid water content for icing δTHLWC is pre-selected as a constant, wherein the δTHLWC is selected as 0.002 grams/cubic meter. It should be understood that constant values for the δTHLWC other than the value exemplified herein may be used. In an alternative embodiment, the dead-band threshold liquid water content for icing δTHLWC is defined as a function of ambient conditions, and more specifically ambient static pressure PS.

If the processor 36 determines the measured liquid water content LWC is less than the difference between the threshold liquid water content for icing THLWC and the dead-band threshold liquid water content for icing (δTHLWC), the processor 36 sends an output signal to the ice protection system controller 26 to de-activate the ice protection system if it is operating, and the processor 36 re-starts the method beginning with measuring the static pressure PS, the total pressure PT, the total temperature TT, and the liquid water content LWC of the ambient air. In one embodiment, when the ice protection system has been de-activated, the processor 36 sends an advisory signal to notify the aircraft flight crew the ice protection system has been de-activated.

If the processor 36 determines the measured liquid water content LWC is greater than or equal to the difference between the threshold liquid water content for icing THLWC and the dead-band threshold liquid water content for icing (δTHLWC), the processor 36 maintains the operating status of the ice protection system and re-starts the method beginning with measuring the static pressure PS, the total pressure PT, the total temperature TT, and the liquid water content LWC of the ambient air. In one embodiment, when the processor 36 maintains the operating status of the ice protection system, the processor 36 sends an advisory signal to notify the aircraft flight crew the operating status of the ice protection system is being maintained.

If the processor 36 determines the measured liquid water content LWC is greater than or equal to the threshold liquid water content for icing THLWC, the processor 36 concludes the ambient conditions, including the ambient air humidity, are conducive to ice formation. The processor 36 then sends an output signal to the ice protection system controller 26 that activates the ice protection system. In one embodiment, when ambient conditions are conducive to ice formation, the processor 36 sends an advisory signal to notify the aircraft flight crew the ambient conditions are conducive to ice formation. Additionally, in one embodiment, when the processor 36 has activated the ice protection system, the processor 36 sends an advisory signal to notify the aircraft flight crew the ice protection system has been activated. The method then re-starts, beginning with measuring the static pressure PS, the total pressure PT, the total temperature TT, and the liquid water content LWC of the ambient air, to re-evaluate ambient air conditions.

Although the methods are described and illustrated herein in the exemplary manner, it should be understood that the methods might include the measurement and use of other parameters that may or may not be described herein to detect conditions conducive to ice formation. For example, although the exemplary methods described herein use either a dew point temperature sensor or a liquid water content sensor to detect ambient moisture conditions, it should be understood that the methods described herein may use other sensor types that may or may not be described herein to detect ambient moisture conditions. Additionally, although the methods are described and illustrated herein as including the measurement and use of a static pressure, a total pressure, a total temperature, and either a dew point temperature or a liquid water content, it should be understood that the method may not include the measurement and use of all of such parameters (static pressure, total pressure, total temperature, dew point temperature, and/or liquid water content), but rather, the method may include the measurement and use of any number of these parameters, alone or in combination, to detect conditions conducive to ice formation.

The above-described detection system is cost-effective and reliable for detecting conditions conducive to ice formation. More specifically, in the exemplary embodiment, the detection system measures a static pressure, a total pressure, a total temperature, and either a dew point temperature or a liquid water content, and processes the measurements to determine whether conditions conducive to ice formation are present. Based on the determination of whether conditions conducive to ice formation are present, the detection system may automatically control ice protection systems, and may also generate advisory signals. In the exemplary embodiment, the detection system determines whether ambient air conditions are conducive to the formation of ice on the surfaces of an aircraft. Based on whether ambient air conditions are conducive to ice formation, the exemplary detection system automates ice protection systems for the aircraft engine and flight surfaces, and generates advisory signals for the aircraft flight crew. The exemplary detection system is operable over the complete range of FAR icing environments.

Although the invention is herein described and illustrated in association with an aircraft, and more specifically, in association with the detection of ambient conditions conducive to ice formation on surfaces of the aircraft, it should be understood that the present invention is generally applicable to the detection of conditions conducive to ice formation in any context and/or with regard to any vehicle. Accordingly, practice of the present invention is not limited to the detection of ambient conditions conducive to ice formation on the surfaces of an aircraft, nor is practice of the present invention limited to aircraft generally.

Exemplary embodiments of icing condition detection systems are described above in detail. The systems are not limited to the specific embodiments described herein, but rather, components of each system may be utilized independently and separately from other components described herein. Each icing condition detection system component can also be used in combination with other icing condition detection system components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method in a processor device for identifying conditions conducive to the formation of ice, comprising:
   comparing, by the processor device, a static temperature value, representative of a static temperature external to an aircraft, to a first threshold temperature and a second threshold temperature higher than the first;
   comparing at least one of (a) a liquid water content value of air in an air collection passage, representative of a liquid water content external to the aircraft, to a threshold liquid water content, and (b) a dew point temperature of air in the air collection passage, representative of a dew point temperature external to the aircraft, to a threshold dew point temperature; and
   if the static temperature value is at or above the first threshold temperature and at or below the second threshold temperature, and at least one of (a) the liquid water content value is at or above the threshold liquid water content, and (b) the dew point temperature is below the static temperature, directing an action associated with conditions conducive to ice formation.

2. The method of claim 1 wherein directing an action includes directing an advisory signal.

3. The method of claim 1 wherein directing an action includes directing activation of an ice protection system.

4. The method of claim 3 wherein directing activation of an ice protection system includes directing activation of an ice protection system positioned at a wing leading edge of the aircraft.

5. The method of claim 3 wherein directing activation of an ice protection system includes directing activation of an ice protection system positioned at an inlet of the aircraft.

6. The method of claim 1, further comprising carrying out the following operations if the static temperature value is below the first threshold temperature:
   comparing the static temperature value to the difference between the first threshold temperature and a deadband temperature value;
   if the static temperature value is greater than or equal to the difference, maintaining an ice protection system aboard the aircraft in an active state; and
   if the static temperature value is less than the difference and the ice protection system is in an active state, deactivating the ice protection system.

7. The method of claim 1, further comprising carrying out the following operations if the static temperature value is above the second threshold temperature:
   comparing the static temperature value to the sum of the second threshold temperature and a deadband temperature value;
   if the static temperature value is less than the sum, maintaining an ice protection system aboard the aircraft in an active state; and
   if the static temperature value is greater than or equal to the sum, and the ice protection system is in an active state, deactivating the ice protection system.

8. The method of claim 1, further comprising carrying out the following operations if the liquid water content value is above the threshold liquid water content:
   comparing the liquid water content value to the sum of the threshold liquid water content and a deadband liquid water content value;
   if the liquid water content value is greater than or equal to the sum, maintaining an ice protection system aboard the aircraft in an active state; and
   if the liquid water content value is less than the sum, and the ice protection system is in an active state, deactivating the ice protection system.

9. The method of claim 1, further comprising:
   receiving an indication of a static pressure and a total pressure external to the aircraft;
   receiving an indication of a total temperature and a liquid water content external to an aircraft; and
   determining the static temperature value based at least in part on a measured total temperature.

10. The method of claim 9, further comprising determining at least one of the first and second threshold temperatures as a function of the static pressure.

11. The method of claim 9, further comprising determining the second threshold temperature as a function of the static pressure.

12. The method of claim 9, wherein determining the static temperature value includes determining the static temperature value based at least in part on the total temperature, the static pressure, and the total pressure.

13. The method of claim 1 wherein comparing the static temperature value includes comparing the static temperature value to a first threshold temperature having a constant value.

14. The method of claim 1 wherein comparing the static temperature value includes comparing the static temperature value to a second threshold temperature having a constant value.

15. The method of claim 1 wherein comparing the static temperature value includes comparing the static temperature value to a first threshold temperature that is a function of the static pressure.

16. The method of claim 1, further comprising determining at least one of the first and second threshold temperatures from a table.

17. The method of claim 1, further comprising determining at least one of the first and second threshold temperatures from a mathematical relation.

* * * * *